United States Patent
Koppelman et al.

(10) Patent No.: US 6,662,164 B1
(45) Date of Patent: *Dec. 9, 2003

(54) METHOD AND APPARATUS FOR DETERMINING COMMISSION

(75) Inventors: Joshua Koppelman, Austin, TX (US); Jens Tellefsen, Austin, TX (US)

(73) Assignee: Trilogy Development Group, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,857

(22) Filed: May 19, 1998

(51) Int. Cl.[7] .............................................. G06F 17/60
(52) U.S. Cl. .......................................... 705/14; 705/11
(58) Field of Search .................................. 705/14, 1, 11

(56) References Cited

U.S. PATENT DOCUMENTS

| | | | |
|---|---|---|---|
| 4,825,360 A | | 4/1989 | Knight, Jr. |
| 5,483,444 A | * | 1/1996 | Heintzeman et al. ........ 364/401 |
| 5,732,263 A | * | 3/1998 | Havens et al. .............. 707/100 |
| 5,832,268 A | * | 11/1998 | Anderson et al. ......... 707/104.1 |
| 6,105,001 A | * | 8/2000 | Masi et al. ................... 705/14 |
| 6,134,533 A | * | 10/2000 | Shell ........................... 705/14 |
| 6,275,871 B1 | * | 8/2001 | Reinfelder et al. .......... 709/328 |

FOREIGN PATENT DOCUMENTS

EP 0817017 A2 * 1/1998 ............. G06F/9/46

OTHER PUBLICATIONS

Martin, James, Principles of Object–Oriented Analysis and Design, Prentice Hall, 1993.*

(List continued on next page.)

*Primary Examiner*—Tariq R. Hafiz
*Assistant Examiner*—Susanna Meinecke-Díaz

(57) ABSTRACT

The invention provides for a method and apparatus for determining the commission to be paid to a sales representative or sales team. Whenever a sale occurs, a Transaction describing the sale is created and inputted into the Commission system of one embodiment of the invention. Based on a set of Allocation Rules that specify the credit an individual is to receive from a Transaction, the Transactions are converted into several Allocations for individual Sales Representatives or Sales Teams. One or more Quotas specify a target or goal that must be reached to earn commission for each Sales Team. A Quota State indicates the current performance of a Sales Representative with respect to a particular Quota within a particular time frame. The Quotas are used to convert the Allocations/Transactions into Quota Details that specify how to increment or decrement the Quota State. A Promotion specifies the reward or commission that is received upon attaining a desired level of performance. Once a Quota State reaches a level necessary to receive a Commission or reward as set by a specific Promotion, a ledger item indicating the amount to be paid to a particular Sales Team is created. A user interface may be used to create Allocation Rules, Quotas, and Promotions that are awarded for performance over a specified time period. In this manner, a business may set up incentive plans and determine commissions easily and accurately.

66 Claims, 7 Drawing Sheets

OTHER PUBLICATIONS

Patent Office Professional Association, "Agreement Between U.S. Department of Commerce/Patent and Trademark Office and the Patent Office Professional Association," pp. 39, 93, 94, 97–100, 1986.*

U.S. Patent & Trademark Office, "Manual of Patent Program Procedure," Published Oct. 31, 1989.*

U.S. Patent & Trademark Office, "PALM 3 User's Guide," Published Oct. 31, 1989.*

U.S. Patent & Trademark Office, "PALM Sample Printouts," Published Oct. 31, 1989.*

U.S. Patent & Trademark Office, "Examiner's Bi–Weekly Time Worksheet (Form PTO 690E)," 1995.*

"SC Commission" [Retrieved from the Internet, http://web.archive.org/web/1997062419305 . . . www.trilogy.com/modules/sccommission on Feb. 4, 2002. The snapshot of this web page was downloaded to web.archive.org on Jun. 24, 1997; however, the page information states that the "SC Commission" web page was last modified on Mar. 12, 1997.]*

"Selling Chain" [Retrieved from the Internet, http://web.archive.org/web/19970624190842/www.trilogy.com/products1 on Feb. 4, 2002. The snapshot of this web page was downloaded to web.archive.org on Jun. 24, 1997; however, the page information states that the "Selling Chain" web page was last modified on Mar. 6, 1997.]*

Hansen, Hans Robert, "Wirtschaftsinformatik I," Lucius & Lucius.

Trilogy–Volvo Master License Agreement, Apr. 29, 1997.

* cited by examiner

METHOD AND APPARATUS FOR DETERMINING COMMISSION

BACKGROUND OF THE INVENTION

1. Field of the Invention

This invention relates to the field of determining the sales commission provided to sales teams and representatives.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

In modern business environments, it is commonplace to employ sales representatives to market the goods and services offered for sale. Sales representatives receive compensation based on a salary, the hours worked, and/or on the goods or services sold. When basing compensation on the goods or services sold, sales representatives receive a commission that can be based on profits, net sales, the number of products sold, or some other variable.

To provide sales representatives with an incentive to sell as much as possible or to sell more of a desired product or products at certain prices, sales organizations create incentive plans wherein Commissions (also referred to as Promotions) are provided or offered to the sales representatives when specific sales goals or targets are attained during a defined time period. For example, a Promotion may consist of paying a bonus of $50 if a blue hammer is sold in the month of July or paying $1 for each of the first 1000 hammers sold and $2 for any additional hammer sold in the month of July. Some incentive plans provide for individual sales representatives to be apportioned credit towards a promotional level (such as a bronze, silver, or gold level) when a sale is made.

In addition, an incentive plan may apportion credit (towards a Promotion) to everyone on a sales representative's sales team, to the representative's manager, or someone other than the sales representative himself. Providing credit to persons in a selling chain (i.e., an immediate supervisor, a manager, a senior manager, etc.) is referred to as an override or rolling up (a "roll-up") the selling chain. Figuring out who should be apportioned credit for a sale can be complex and difficult to administer. This is particularly true when a company has several different types of sales people from direct representatives, external agents, telemarketers, to distributors and resellers. The increasing use of sales teams, account territory, and product managers has further complicated the management of sales crediting.

The management of a business can spend a great deal of time and money in developing incentive plans. In the prior art, the creation and distribution of incentive plans is a slow process that is prone to error. Large businesses merely print up or email a plan to retailers. The retailers add Promotions and targets to the plan and distribute the plan to the sales representatives. To calculate the payment or Promotion each sales representative will receive, the sales information is mailed back to the businesses' headquarters where the calculations and determinations are made. The Promotion or payment is then transmitted back to the retailer and distributed to the sales representative. Mistakes in the calculations can often be made at headquarters requiring a repetition of the entire process. Often the sales representatives do not receive a copy of the plan prior to making sales. Consequently, the sales representatives are unaware of the basis for their compensation or how an incentive plan works until after compensation is received (which can occur one or two payment periods after the sales have occurred and after the promotion's time period has expired). Such a delay defeats the underlying purpose of an incentive plan to promote the sale of particular products or services (i.e., the sales representative does not know what products or services the sales organization desires to promote).

In today's competitive environment, companies thrive (and survive) on the basis of being able to quickly change and evolve. This is especially true in the sales and marketing area where rapid business changes are the norm. Competitive companies cannot afford being obligated to adhere to a static information infrastructure or a slow incentive plan process that cannot keep up with a rapidly changing business environment.

In a traditional system solution, the particular business rules are broken down into their core components, which in turn are programmed using some computer language. The traditional system is adequate to represent a rigid and static business problem, like a general ledger or inventory system, for example. However, the traditional system is costly when trying to represent a quickly changing business environment like that of a sales organization, which role is to constantly change and to evolve to align itself to changing customer needs, market changes, sales channels and internal business initiatives.

Retailers are often not permitted to modify or create their own incentive plans for the sales representatives. An incentive plan can only be selected from a list of predefined plans created at a business headquarters. Further, sales representatives can often manipulate an incentive plan (by their actions) to obtain additional compensation unintended by management. In addition, the ability to view and organize information regarding sales transactions is unavailable or difficult in the prior art. Thus, retailers cannot easily observe statistics such as the products or services that are selling quickly, which sales teams or representatives are selling the most, the average cost a particular product is being sold for, etc.

Thus, a system that quickly communicates an incentive plan to sales representatives, accurately and effectively calculates compensation to be paid to sales representatives, and allows flexibility to adjust an incentive plan as needed in a rapidly changing environment is desired.

SUMMARY OF THE INVENTION

The invention provides for a method and apparatus for determining the commission to be paid to a sales representative or sales team. Whenever a sale occurs, a Transaction describing the sale is created and inputted into the Commission System of one embodiment of the invention. Based on a set of Allocation Rules that specify the credit an individual is to receive from a Transaction, the Transactions are converted into one or more Allocations for individual Sales Representatives or Sales Teams.

One or more Quotas specify a target or goal that must be reached to earn commission for each Sales Team. A Quota State indicates the current performance of a Sales Representative with respect to a particular Quota within a particular time frame. The Quotas are used to convert the Allocations/Transactions into Quota Details that specify how to increment or decrement the Quota State.

A Promotion specifies the reward or commission that is received upon attaining a desired level of performance. Once a Quota State reaches a level necessary to receive a Commission or reward as set by a specific Promotion, a ledger item indicating the amount to be paid to a particular Sales Team is created.

A user interface may be used to create Allocation Rules, Quotas, and Promotions that are awarded for performance over a specified time period. In this manner, a business may set up incentive plans and determine commissions easily and accurately.

DETAILED DESCRIPTION OF THE INVENTION

The invention is a method and apparatus for determining commission. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Computer Execution Environment (Hardware)

Figure 1:
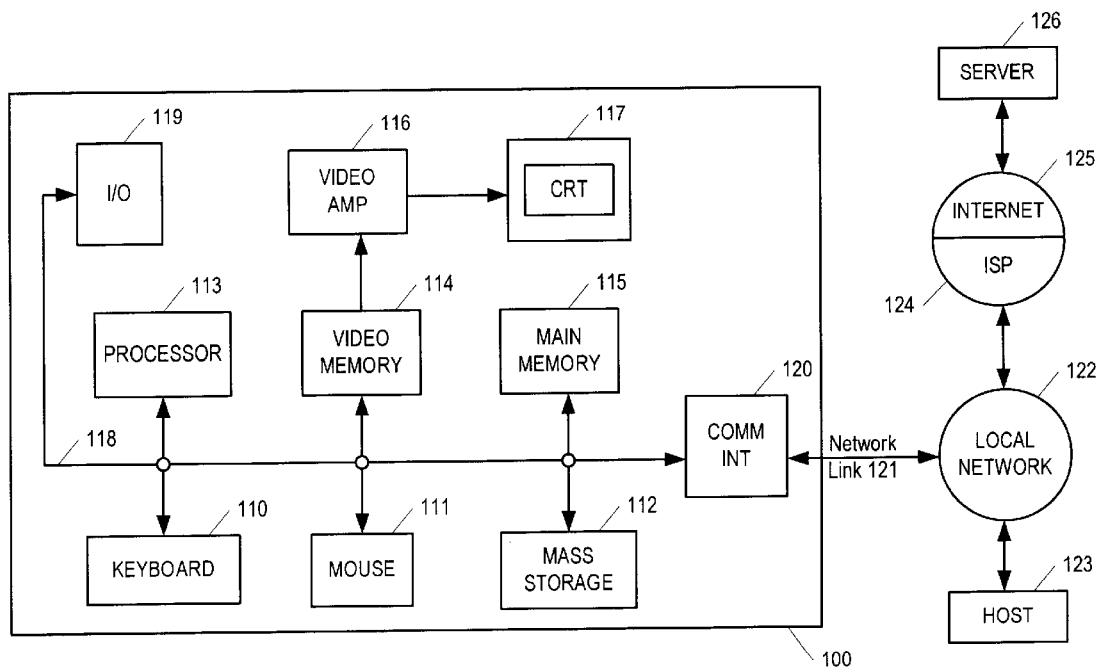
FIG. 1 is a block diagram of one embodiment of a computer system capable of providing a suitable execution environment for an embodiment of the invention.

An embodiment of the invention can be implemented as computer software in the form of computer readable code executed on a general purpose computer such as computer 100 illustrated in FIG. 1, or in the form of bytecode class files running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bidirectional system bus 118 represents such I/O elements as a printer, A/V (audio/video) I/O, etc.

Computer 100 includes a video memory 114, main memory 115 and mass storage 112, all coupled to bidirectional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680×0 processor or a microprocessor manufactured by Intel, such as the 80×86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such application is that of determining the commission to be disbursed to a sales representative.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Utilization of Computer Software

In one embodiment of the invention, computer software that utilizes multiple related functions and data structures is utilized. To encapsulate these related functions and data structures, one embodiment of the invention utilizes a standard object oriented programming (OOP) language approach. To provide an understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class.

An object is a generic term that is used in the object-oriented programming environment to refer to a module that contains related code and variables. A software application can be written using an object-oriented programming language whereby the program's functionality is implemented using objects. The encapsulation provided by objects in an object-oriented programming environment may be extended to the notion of transactions, allocations, quotas, quota details, quota states, and promotions as discussed below.

In one embodiment of the invention, a shell object mechansim is utilized to store and provide access to objects and data. Such a mechanism is discussed in detail in pending U.S. patent application Ser. No. 08/931,878 entitled "Method and Apparatus for Providing Peer Ownership of Shared Objects" which is hereby incorporated by reference.

Embodiment of Object Model for Determining Commissions

One embodiment of the invention provides the ability to determine Commissions and amounts payable to sales representatives (referred to as a "Commission System"). The Commission System provides an open, extensible object model that allows the business user to define any number of arbitrary properties (also referred to as hierarchies or object hierarchies) that model the structures associated with a business, such as a business' customers, products, and sales teams (in addition to a default model that specifies a set of hierarchies). These properties can then be used through a Commission calculation process to determine the payment for a sales representative.

Hierarchies

One model of the invention consists of a set of five (5) components or hierarchies: Sales Representative, Product, Customer, Quota, and Plan.

Sales Representative

The Sales Representative hierarchy represents the sales organization of a business and the person or entity that makes a sale. It can represent and may consist of individual sales representatives, or sales manager(s), a selling group/team, a retailer, or any number of arbitrary organizations. The Sales Representative hierarchy is used to represent the individual or group that makes a sale. "Sales Representative" is used interchangeably with "Sales Team" to represent an individual or group of persons throughout this document. Sales teams/groups are stored in a hierarchy tree, which is used to represent and manipulate different organization groups. A sales team can belong to one or several groups in the tree.

Product

The Product hierarchy represents what is being sold. A Product can be a product identification number, product group, or category, for example. Products are similarly stored in a hierarchy tree, which can be used to represent products lines, promotional groups, regionality (where a product is sold or built), categories, etc.

Customer

The Customer hierarchy represents the customer that a product is sold to. A Customer hierarchy can represent an individual customer or account. Similar to Sales Representatives and Products, Customers are stored in a hierarchy tree, which in turn can represent industries, territories, regions, type of sales, and other customer segments.

Quota

A Quota, also referred to as a Performance or Bucket, defines the sales performance to track and accumulate. Quotas can be defined to track any performance measure (units, sales volume, profit margin, etc.) over any time period (weekly, monthly, quartedy, yearly, etc.) across any number of sales teams (sales reps, sales teams, regions, etc.). Quotas are used to calculate bonuses and Commissions, sales tracking and other types of performance reasures.

Plans

Plans define the reward for a certain performance and consist of a collection of Promotions (also referred to as a Bonus, Commission, or Compensation). Plans are the link between performance and earnings. Promotions calculate an earnings payment based on a formula using one or several performance variables.

In addition to the above default hierarchies, one embodiment of the invention permits the creation or specification of additional arbitrary hierarchies by a user. Additional hierarchies can represent actual groups or entities (such as employees) or non-existent groups that may be used to collect statistics.

Processing Sales Transactions

Figure 2:
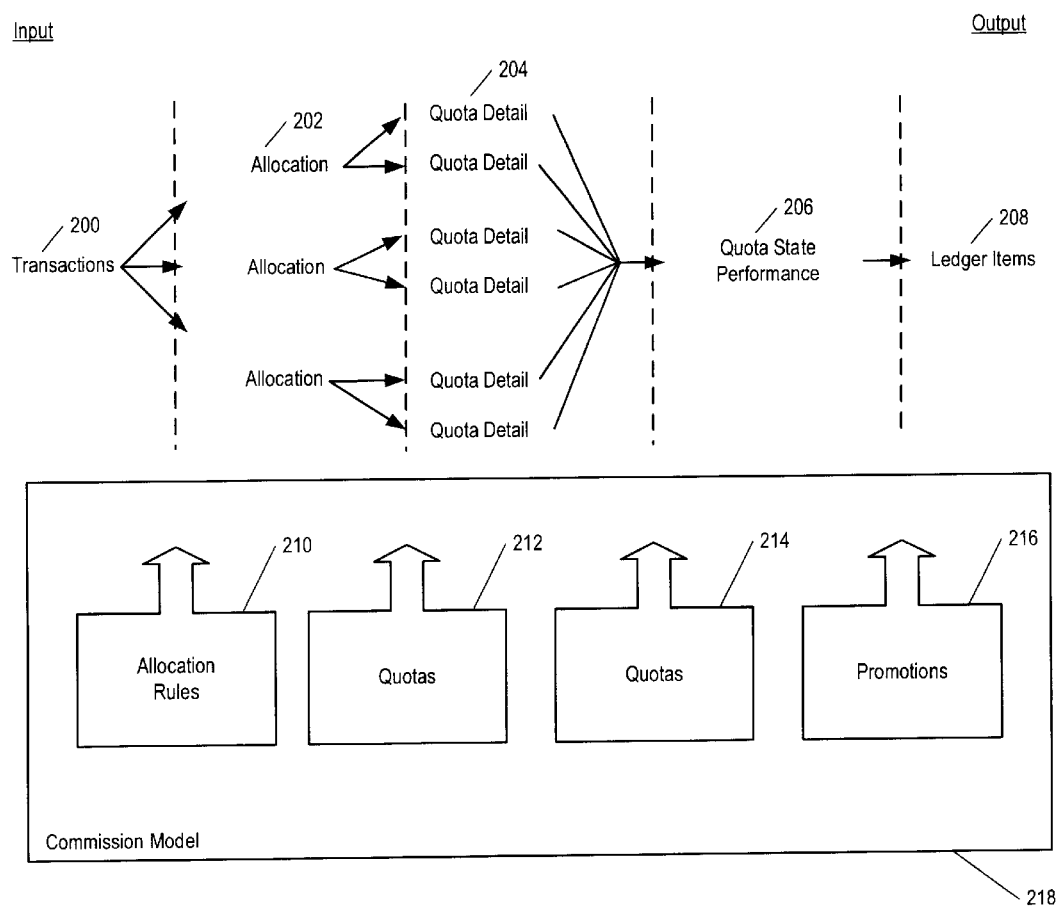
FIG. 2 illustrates the flow of transactions and the components that provide the mechanisms that govern the flow in accordance with one embodiment of the invention.

The hierarchies defined above maintain data and methods to enable the Commission System to efficiently and accurately process sales. FIG. 2 demonstrates the processing that occurs in one embodiment of the invention from the sale of a Product or service to payment of a Commission to a Sales Representative. The Commission Model 218 indicates the mechanism which governs how the processing occurs. When a sale is made, a sales transaction 200 is input into the system. Through a set of rules 210, Sales Representatives are apportioned or allocated credit in the form of Allocations 202. Quotas 212 and 214 process the Allocations 202 into Quota Details 204 that contain the change in the current status of the sales representative's progress towards a Promotion. The current status is also referred to as the Quota State or Quota State Performance 206. The amount a Sales Representative is to receive as a result of the sales transactions is determined by a calculation in a Promotion Object 216. Once determined, the amount is converted into a Ledger Item 208 and distributed out to the Sales Representative.

To provide an understanding of how each object of the Model 218 governs the commission process, each object and its, effect on the transaction flow through the Commission System/engine will be discussed in detail below.

Transactions

Figure 3:
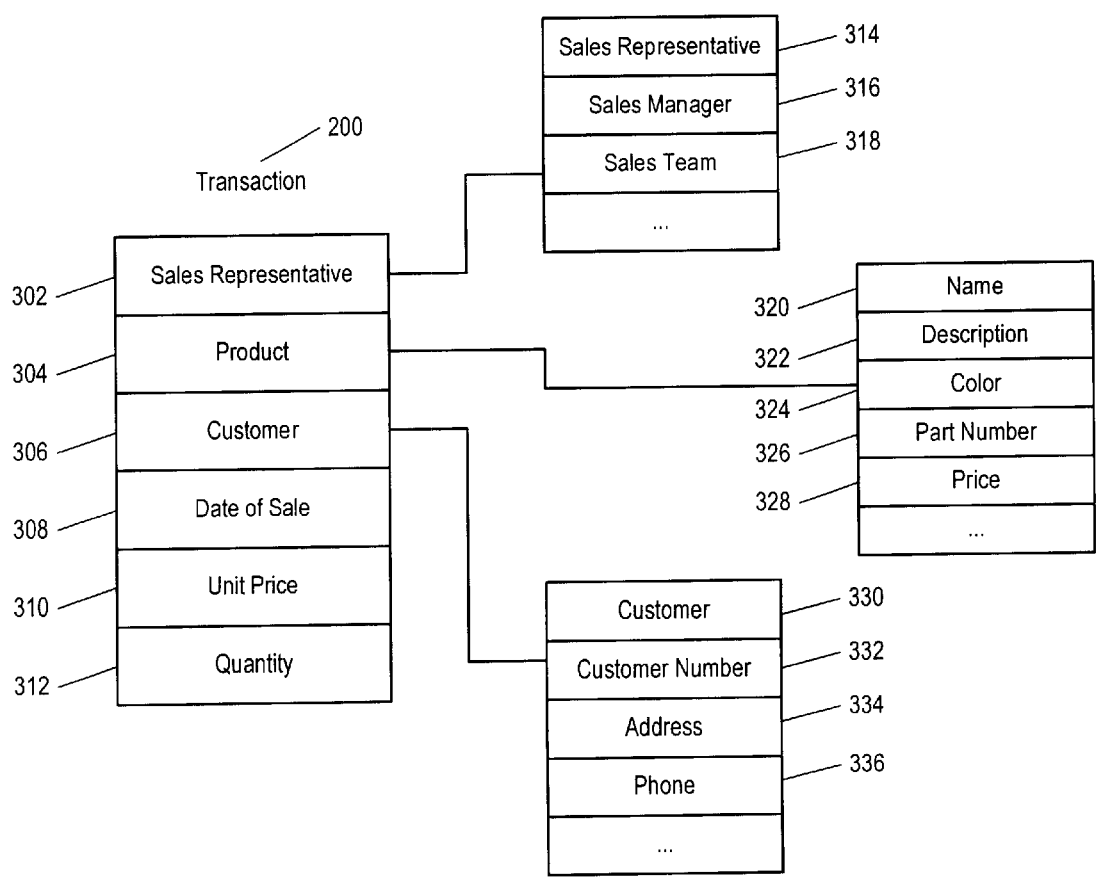
FIG. 3 illustrates the properties of several objects in accordance with one embodiment of the invention.

Transactions contain information regarding a sale and may be viewed as a line item in a sales order. Each transaction is independent from each other such that the order in which a transaction occurs or is entered into the system is not relevant. Referring to FIG. 2, the input to the Commission system is a Model 218 and a set of Transactions 200. The Model 218 is static, and describes the Promotions, Products, and organizational hierarchy referenced by the incentive program. The Transactions 200 typically describe who sold what to whom and when. A Transaction may also answer the questions "why?", "how many?", and "for how much?". Transactions 200 may be arbitrarily extended to contain any number of properties and these properties may later be referenced or used by other components and hierarchies of the system. Referring to FIG. 3, a Transaction's properties may be basic types (e.g., types 308–312), sub-objects (e.g., sub-objects 302–306), or basic types of sub-objects (e.g., types 314–336). A default Transaction 200 may contain properties for a Sales Representative 302 (the Sales Representative who made the sale), a Product 304 (what was sold), a Customer 306 (who bought the product), the Date of the Sale 308, the Unit Price 310, and Quantity sold 312.

It is often the case, however, that the person who makes the sale is not the only person who gets credit for the sale. Often, a Sales Representative's Manager may get credit for some portion of the sale. Alternatively, the person in charge of the product that was sold should get credit for the sale. Additionally, a Transaction 200 may not indicate a Sales Representative; credit may need to be decided by some set of predefined rules. Further, one person may belong to several different groups at the same time (referred to as multiple inheritance). For example, one embodiment of the invention provides the ability for Jon Smith to be a member of Sales Team Blue, Sales Team Red, and Sales Manager over Lucy all at the same time. In this manner, Jon may receive credit through various sales that Jon himself did not initiate. Multiple inheritance may also be utilized to create virtual sales teams to maintain statistics and information.

Allocations

Figure 4:
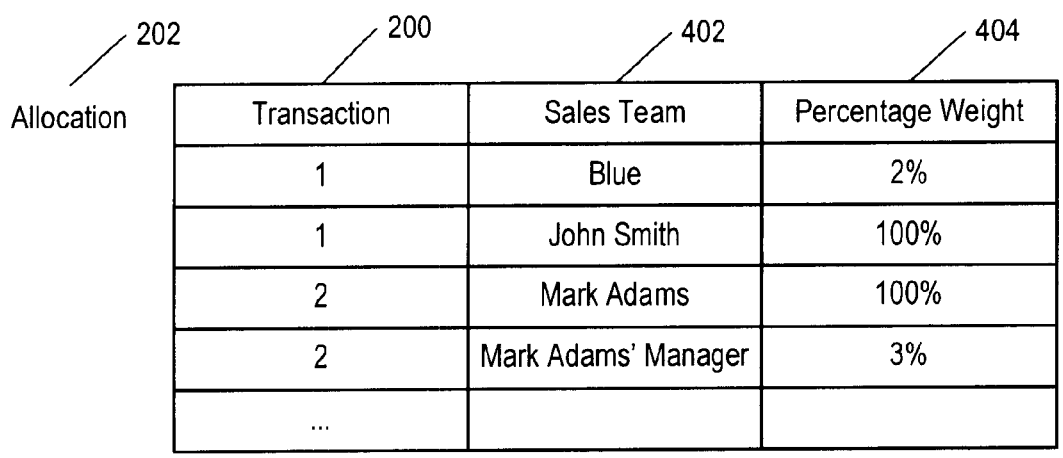
FIG. 4 illustrates one or more allocation in accordance with one embodiment of the invention.

The Commission System uses the term "Allocation" 202 to indicate credit allocated to a single individual or group on a single sale/Transaction. An allocation may be viewed as a Transaction that is tied to a Sales Representative at a certain weight. Referring to FIG. 4, an Allocation 202 may be an object that references the Transaction 200, a Sales Team or Representative 402 who will get credit for that Transaction 200, and the percentage weight of credit 404 for the Transaction that the Sales Representative 402 receives. The total weight of all Allocations 202 for a single Transaction 200 does not need to total one (1) or 100%. In FIG. 4, each allocation is represented by a row. For example, as demonstrated in FIG. 4, transaction number one may result in sales team blue being allocated 2% credit and John Smith, the sales representative, being allocated 100% credit. Transaction number 2 may result in Mark Adams, the sales representative, being allocated 100% credit and Mark Adam's manager being allocated 3% credit.

Allocation Rules

The mechanism that decides how Allocations 202 are created from Transactions 200 is the set of "Allocation Rules" 210. To understand how Allocation Rules 210 are written, it is best to look at the kind of questions an Allocation Rule 210 will need to address. For a given Transaction 200, the following are examples of how Allocations 202 may need to be created.

---

Example I.

1. If Sales Representative Joshua made the sale, give Joshua 100% credit for the sale.
2. If sales manager Eileen or anyone working under her made the sale, give Eileen 20% credit for the sale.
3. If the color of the Product sold is "Red", -continued Example I.

give 5% credit to 'The Red Team'.
4. If the sale was made to any of the 'Large Customers',
give John 10% credit.
5. If the number of units sold is between 100 and 500,
give 5% credit to Brennan.

Each of the examples above represents a different type of Allocation. To understand the use of Allocation Rules to allocate credit, it is useful to examine the type of Allocation generically. Referring to the examples above, situation 1 is a Sales Team or Sales Representative type of Allocation wherein a Sales Representative, Josh, is allocated credit for a Transaction. Situation 2 is a Roll-up type of Allocation wherein a Sales Manager, Eileen, is allocated credit for a Transaction made by another person. The Transaction is rolled-up the selling chain to the sales manager, Eileen. Situation 3 is a property of a product type of transaction wherein a property of a product, the color, is being utilized to allocate credit for the Transaction. Situation 4 is a property of a Customer type of transaction wherein a property of a customer, Large Customers, is utilized to allocate credit for the Transaction. Situation 5 is a quantity in a range type of Allocation wherein a quantity range, the number of units sold, is utilized to allocate credit for the Transaction.

It is useful to have a language that has the ability to describe each of these conditions/situations, in any (boolean) combination. Rule Templates may provide this ability. In one embodiment, a Rule Template is the mechanism for describing how the user expects the rules to "look". The Rule Template is used both in generating Allocations 202, and in filtering or determining eligible Quotas (discussed below).

A Rule Template consists of a collection of Allocation Rules 210. Each Allocation Rule 210 is represented by a Name (or number) and a collection of Rule Attributes. Each Rule Attribute corresponds to a qualitative description of one of the examples above; the Rule Attribute contains a Transaction-based Property, an Operation, and an Alias. If all of the conditions in Example 1 need to be handled at once, the following Rule Attributes would be present in the Rule Template (Table 1):

TABLE 1

|   | Property | Operation | Alias |
| --- | --- | --- | --- |
| 1 | SalesTeam | = | Sales Representative |
| 2 | SalesTeam | = | Sales Manager |
| 3 | Product.Color | = | Color |
| 4 | Customer | = | Customer |
| 5a | Quantity | > | Quantity Min |
| 5c | Quantity | < | Quantity Max |

Figure 5:
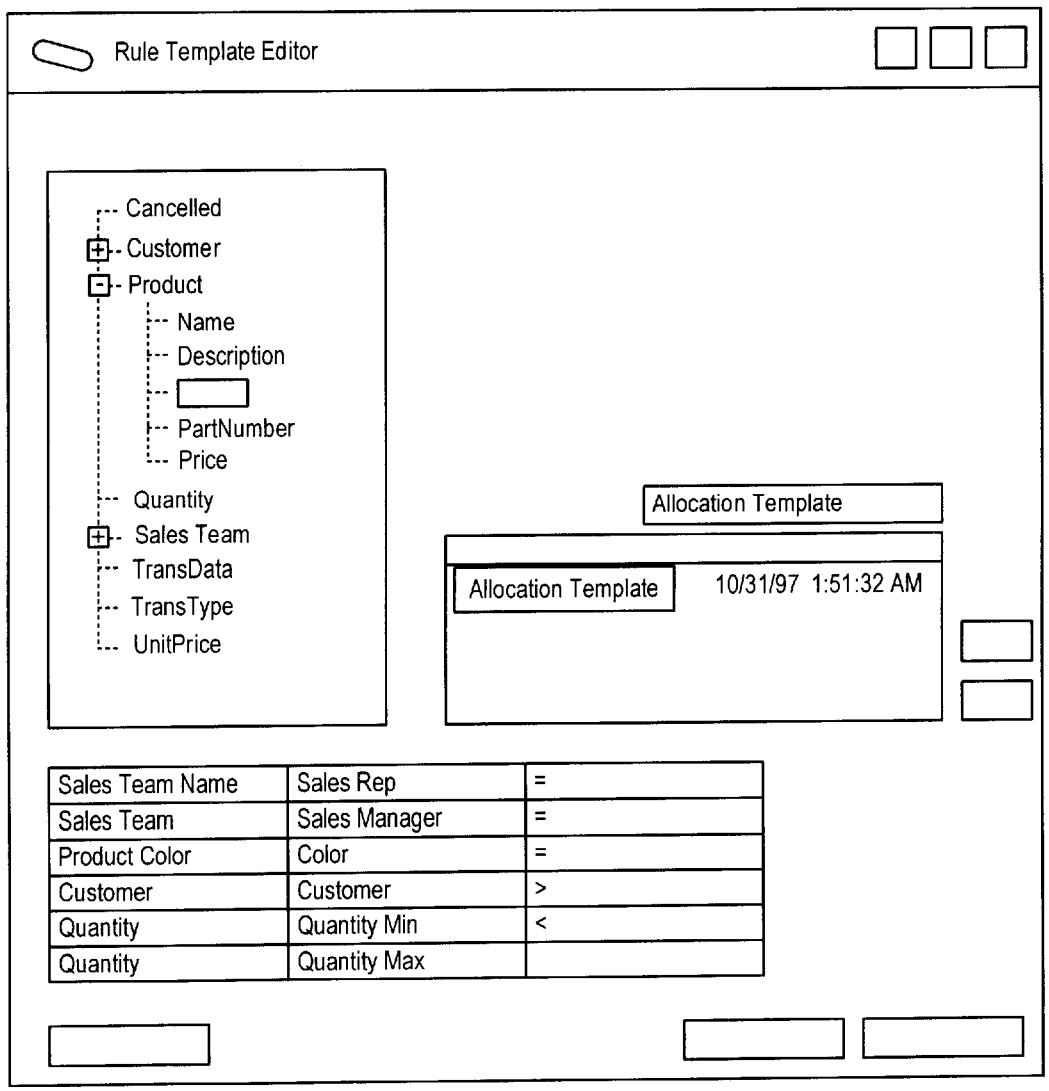
FIG. 5 is a screen print-out of a Rule Template Editor in accordance with one embodiment of the invention.

Referring to FIG. 3 and Table 1, "Property" is a subproperty of the Transaction object 200 which will need to be referenced. This can be a "deep property", like "Product-.Color" 324, that is a property of an object (e.g., Product 304) referenced from the Transaction 200. The "Operation" describes how to match the value, and the "Alias" is simply how the user interface will display this attribute. FIG. 5 is a screen shot of the Rule Template Editor user interface that allows for the creation and modification of a Rule Template as provided by one embodiment of the invention.

Referring to Table 1, row 1 represents a rule in which a sales representative is allocated credit for a sale. The user views the person allocated credit in the Sales Representative Property as a Sales Representative (the alias). Row 2 represents a rule in which the Sales Manager is allocated credit for a sale made by any of the Sales Representatives that she manages (i.e., the sales manager's children in the SalesTeam hierarchy). The Sales Manager's children's sales are rolled up to allocate credit to the Sales Manager. This representation is similar to the representation in Row 1 but for a different person being allocated credit. The user views the person allocated credit in the Sales Representative Property as the Sales Manager. Row 3 represents a rule in which the color of a product determines who is allocated credit. The user interface displays "Color" (the alias) that is represented by the Property Product.Color. Row 4 represents a type of customer that is allocated credit and the user views the term "Customer". Situation 5 of Example 1 is represented by two sets of Rule Attributes in Table 1, rows 5a and 5b. Row 5a represents that the Quantity Property must be over a certain minimum for credit to be allocated. Row 5b represents that the Quantity must be less than a certain maximum for credit to be allocated. The user interface displays the alias Quantity Min and Quantity Max in rows 5a and 5b respectively.

Notice that a "value" is not part of a Rule Attribute; the quantitative "Joshua", 20%, 'Red', etc. is missing. These values are stored in the Allocation Rules themselves. The Rule Attributes describe how the Rules "look" (i.e., a generic representation of the rules), while the Rules themselves contain the actual conditions. Thus, the Rule Template provides a generic representation of the types of rules that may be utilized by the user. By storing Rule Attributes in a Rule Template in this manner, a user can later create rules for allocating credit with other values. For example, using the Rule Attributes in Table 1 above, a user can later create a rule that specifies any type of quantity range, product color, sales manager, sales representative, or type of customer.

Referring to FIG. 2, a Commission Model 218 contains a collection of Rule Sets. In one embodiment a different rule set is stored for each Sales Team or Sales Representative. A Rule Set consists of a Rule Template (i.e., the generic set of type of rules available), a collection of Allocation Rules 210, and the "Recipient"—the Sales Team or Sales Representative that utilizes this particular rule set. An Allocation Rule is "fired" when every condition of the rule is met. Each Allocation Rule consists of the allocation weight to be credited for the resulting Allocation, a collection of values, and a collection of Rule Attributes. Each value corresponds to a Rule Attribute, and the rule will fire if all of the conditions in the Rule Attribute are met. Thus, an Allocation rule can be viewed as a set of pairs of Rule Attributes and corresponding Values. Referring to FIG. 2, for every Allocation Rule 210 that fires, one Allocation 202 is created.

The rules corresponding to Example I above are illustrated in Table 2 below. Note that for figure simplicity the recipient (not shown) for all these rules is the same, since the rules are assumed to be utilized by the same Sales Team or Sales Representative.

TABLE 2

|   | Sales Rep | Sales Manager | Cus-Color | tomer | Quantity Minimum | Quantity Maximum | Weight |
| --- | --- | --- | --- | --- | --- | --- | --- |
| 1 | Joshua |   |   |   |   |   | 1.00 |
| 2 |   | Eileen |   |   |   |   | 0.20 |
| 3 |   |   | Red |   |   |   | 0.05 |

TABLE 2-continued

| Sales Rep | Sales Manager | Cus-Color | tomer | Quantity Minimum | Quantity Maximum | Weight |
|---|---|---|---|---|---|---|
| 4 | | | Large Customers | | | 0.10 |
| 5 | | | | 100 | 500 | 0.05 |

Each rule contains conditions that must be met. In rule 1 the value of the Sales Representative must be "Joshua". In Rule 2, the Sales Manager value must be equal to "Eileen". In Rule 3, the Color value must be "Red". In Rule 4, the Customer value must be "Large Customers". The fifth rule contains two conditions which must both be met, the Quantity Minimum value must be 100 and the Quantity Maximum Value must be 500. The allocation weight column illustrates that weight that will be allocated if each condition is met.

To illustrate the above allocation rules, assume that Eileen is Joshua's Manager, and Joshua sells 400 Red Hammers to "The Large Tool Store". In this scenario, five different Allocations will be created: (1) an allocation to Joshua for 1.00; (2) an allocation to Eileen for 0.20; (3) an allocation to the Red Team for 0.05; (4) an allocation to John for 0.10; and (5) an allocation to Brennan for 0.05, with a total weight of 1.4 times the original Transaction.

Quota

A Quota (also referred to as a Quota object) may be viewed as a target that each Sales Representative is trying to reach. It is the end goal or target that is set up in an incentive program that a Sales Representative must reach in order to earn the Commission. Since earning a Commission may be based on a specified time period, a Quota instance is created for each time period desired. Further, each Quota instance contains a collection of additional objects in the system that maintain the current state of performance for each individual Sales Representative (referred to as Quota State, discussed below). Each Quota contains four (4) distinct categories or properties that characterize the Quota's behavior: (1) a Temporal property; (3) a Performance Measure; (3) Eligibility Rules; and (4) Levels (also referred to as Quota Levels). In addition, a fifth property, Targeted, specifies whether targets are to be set on a Sales Team by Sales Team basis (rather than using the same Quota for multiple Sales Teams. The Temporal property provides for a time period within which the Quota is measured. The Performance Measure provides the ability to quantify a transaction and determine how much a specific transaction is worth. The Eligibility Rules determine which Transactions the Quota is interested in to determine whether a commission should or should not be paid (i.e., the standards to reach the target). The Quota Level property provides the range(s) needed to reach or earn a commission. To better understand these properties and their relationships, each property is discussed in detail below.

Temporal Property

A Quota is expected to accumulate statistics for some well-defined time period, and then restart at the beginning of the next period. For example, a monthly Quota would track performance for January, February, etc. At the beginning of each new month, performance would begin at zero. If a Transaction does not occur within the specified time period, then a particular Quota is not interested in that particular Transaction.

There are four time-related properties: Start Date, Duration Unit, Duration Quantity, and Total Periods. The Start Date property contains the date the time period is to begin. The Duration Unit property specifies the type of time period being used (e.g., monthly, yearly, daily, etc.). The Duration Quantity property specifies how many times the Duration Unit property repeats for one Quota (e.g., if Units=Months and Quantity=2, the Quota period last for two months). The Total Periods property specifies how many Quota periods the calculations will be accumulated for.

For illustrative purposes, compare a Quota which begins on Jan. 1, 1998 with Quantity=2, Units="Months", and Periods=6; with a Quota beginning on Jan. 1, 1998 with Quantity=1, Units="years", and Periods=1. Both Quotas become inactive on Jan. 1, 1999, but the first Quota will have six bimonthly "buckets" (and will repeat and collect statistics six (6) times), while the latter will have one large bucket for the entire year.

In another embodiment of the invention, the Temporal properties include a start date and end date. Further, multiple instances of the same Quota object may be created and instantiated with different or overlapping starting and ending dates. In this manner, time periods can accumulate for a single Quota to earn a single Commission. For example, if the target is to sell 1000 hammers in January and 1000 hammers in February, if Jon sells 0 hammers in January and 1200 hammers in February, it may appear that Jon is entitled to earn a Commission based on the February performance. However, by maintaining multiple instances, the system can determine that to "catch up" Jon must earn 2000 hammers by the end of February to earn any Commission. Further, in such an embodiment, the time periods can overlap. For example one time period may run from January 1 to February 1, while another time period for the same Quota can run from January 15 to February 15. Allowing overlapping time periods permits the user to accumulate statistics in various manners or use an increase in sales over multiple specified time periods to determine whether a Commission is due.

When the temporal properties are applied to specific Allocations or Transactions, a boolean result is returned. If the Transaction occurred within the specified time period, True or 1 is returned, and if the Transaction occurred outside of the specified time period, False or 0 is returned.

Eligibility Rules

If there is no way to describe which Transactions a Quota is interested in, only a single Quota is needed, to count all Transactions sold. Eligibility Rules determine the Transactions that a Quota is interested in or that a Quota will use in its determination of a whether a Sales Representative has attained the desired target. In this respect, Eligibility Rules may be viewed as a filter of Transactions. For example, Quota A may only be interested in how many red trucks were sold or how the top salespersons are performing. Any transaction that does not include information regarding red trucks or top salespersons, respectively, would not be utilized by Quota A in determining the Commission. Thus, although Eligibility Rules may appear similar to Allocation Rules, Allocation Rules create Allocations (a non-boolean result) that determine which Sales Representative will earn credit for a particular Transaction. Eligibility Rules determine which Transaction is eligible for a Quota to use in calculating a Commission (a boolean result of true if the Transaction is eligible and false if the Transaction is not).

The Eligibility Rules are established and set up in the same manner as Allocation Rules with Rule Attribute-Value pairs and do not have specific targets associated with the rule. However, dissimilar to Allocation Rules, Eligibility Rules do not have a Sales Representative and Weight associated with the result. Eligibility Rules contain a set of conditions. An Eligibility Rule will "fire" or return a true result if any condition specified is met ("OR" logic is utilized). For example, assume an Eligibility Rule contains the following conditions: (1) Transactions containing "red sedans"; (2) Transactions with quantites greater than 2000; and (3) Transactions with blue trucks. If either condition (1), condition (2), or condition (3) is met, the rule will "fire" and return a true result.

Performance Measure

Once the Commission Engine knows which Transactions apply to a Quota, the Transaction must be quantified. The Performance Measure is a way to quantify a transaction. The Performance Measure consists of a Name of a property (in the Transaction object) and a mathematical formula using the Transaction properties which, when evaluated, tells the Quota how much that Transaction was worth. It provides the ability to quantify and assign a number to a Transaction which may be subsequently used for calculations.

Example 2 illustrates some sample Performance Measures:

|   | Name | Formula |
|---|------|---------|
| 1 | Units | Quantity |
| 2 | Revenue | Quantity * Unit Price |
| 3 | Profit | Quantity * (Unit Price − Product.MfgCost) |

Referring to Example 2, Performance Measure 1 is titled Units and is equal to the Quantity property in a Transaction. Performance Measure 2 is titled Revenue and is based on the Quantity in the Transaction and the Unit Price for each item in the Transaction. Performance Measure 3 is titled Profit and is based on the Quantity in the Transaction times the profit for a quantity of one (e.g., the price of one unit (Unit Price)—the manufacturing cost of a product (Product.MfgCost)). Performance Measure 3, Profit, illustrates how to use a property of the Product sold. Such a use is possible as long as "Product" is an object property on Transaction, and the sub-object has a "MfgCost" (manufacturing cost) property. Similarly, Transaction must have top-level Quantity and UnitPrice properties. Nested properties of arbitrary depth are supported, as long as the resulting property is of the correct type (e.g., a number).

Consider a Transaction in which 1000 hammers were sold for $2.50 each. Some Quotas may be interested in the fact that 1000 hammers were sold (total quantity), while others may be interested in the fact that the Transaction generated $2,500 in revenue. Various Performance Measures provide the ability to quantify the Transaction in the desired method. Example 2 above demonstrates three sample Performance Measures.

Quota Levels

The Quota Levels property consists of a collection of Levels. A Level is an abstraction that specifies a range or goal that the Sales Representative must attain in order to earn a specific Commission. Each Level contains a Name, a Start, and an End. Table 3 illustrates a collection of three Levels:

TABLE 3

|    | Name | Start | End |
|----|------|-------|-----|
| 1. | Bronze | 0 | 3,000 |
| 2. | Silver | 3,000 | 4,000 |
| 3. | Gold | 4,000 | Infinity |

In one embodiment, Quota Levels must be non-overlapping and have non-negative lower bounds (Starts). Table 3 illustrates that to attain the Bronze Level, the Sales Representative must attain between 0 and 3,000. To attain the Silver Level, the Sales Representative must attain between 3,000 and 4,000. To attain the Gold Level the Sales Representative must attain 4,000 or more. Table 3 illustrates a targeted Quota or a Quota that is targeted for a particular SalesTeam or Sales Representative.

The bounds only make sense in the context of the Performance Measure; if the measure is Units, a Sales Representative must sell 3000 units to reach "Silver" level, while if it is Profit, he must sell 3000 dollars. It is often the case that the user will want both large and small Sales Teams to belong to the same Quota. But it hardly seems fair that the smaller team must perform as well as the larger team to achieve their goals. For this reason, it is possible to set targets independently for each participant in a Quota. A Quota's participant set is defined as the union of the participants of all the Promotions that reference that Quota (Promotions are discussed below). Each QuotaLevel in a "targeted" Quota is relative to the target; that is, the upper and lower bounds will be fractions around 1.0. If a Sale Team's target is 4000, Table 3 corresponds exactly with Table 4.

TABLE 4

|    | Name | Start | End |
|----|------|-------|-----|
| 1. | Bronze | 0.00 | 0.75 |
| 2. | Silver | 0.75 | 1.00 |
| 3. | Gold | 1.00 | Infinity |

In Table 4, each bound in the Level is divided by the total target amount of 4,000. Thus, the End bound for the Bronze Level and Start bound for the Silver Level is equal to 3,000/4,000 or 0.75. Similarly, the End bound for the Silver Level and Start Bound for the Gold Level is equal to 4,000/4,000 or 1.0. In this manner, the fractions may be applied to particular Sales Teams with differing goals (e.g., a goal of 4000, 1000, or 20000) merely by multiplying each bounds fraction times the target. Table 4is a non-targeted Quota that is not dependent on a particular SalesTeam but applies to any SalesTeam.

Quota State

In one embodiment of the invention, each instance of the Quota objects discussed above are utilized as a container for a set of Quota States, one for each participant (or Sales Representative). The Quota State also contains the current up-to-the-minute performance information for each Sales Representative. A Quota State may contain the following properties: (1) Sales Representative; (2) Performance (the current performance of the Sales Representative); and (3) Target (what the Sales Representative needs to achieve).

The Performance property of a Quota State maintains the current status and performance of a particular Sales Representative with respect to a particular Quota. Thus, the Performance property is dynamic and changes as the various Transactions flow through the system.

The Target Property of a Quota State provides the total end target for that particular Sales Representative. As discussed above the Target property can be multiplied against every fraction specified in the bounds of a Quota Level to determine the number necessary for a particular Sales Representative to attain a level. To determine the current Level of a Sales Representative, the performance of a Sales Representative stored in the Performance property (which has not been broken down into fractions) is divided by the Target property. The result produces a fraction that can be compared to the Quota Level properties to determine the Sales Representative's status. For example, if the Target is 10000, and the current Performance is 2500, the current status of the Sales Representative is Performance divided by Target or 2500/10000=0.25. 0.25 is then compared to the Quota Level property to determine which Level the Sales Representative has attained.

In one embodiment of the invention, the Target property can consist of a rule instead of a constant number, to impose higher level logic for target calculation. For example, a target may specify a rule requiring a 3% increase over the prior year's performance.

Evaluating the interrelationships of the Transactions, Quota object and Quota State to determine the Performance of a Sales Representative may be done several ways.

Figure 6:
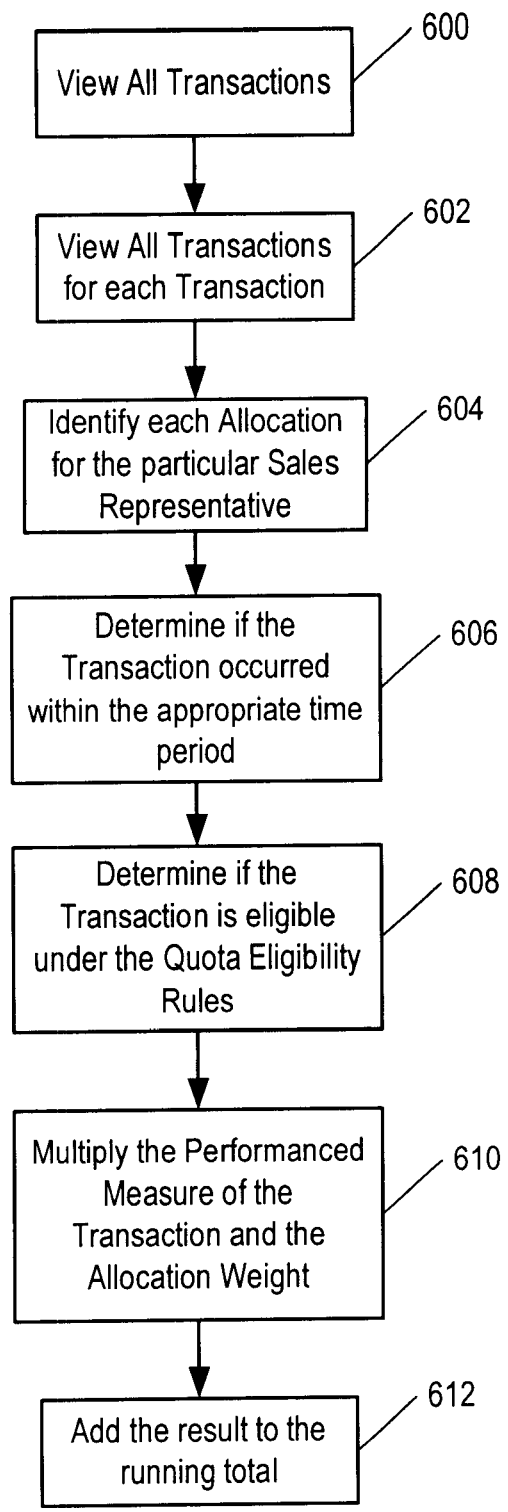
FIG. 6 demonstrates a method for calculating the current performance of a sales representative with respect to a quota in accordance with one embodiment of the invention.

One method for calculating the current Performance of a Sales Representative towards a specific Quota is illustrated in FIG. 6. At step 600, all of the Transactions that have taken place are examined. At step 602, all of the Allocations for each Transaction are examined. At step 604, each Allocation for a particular Sales Representative is identified. At step 606 it is determined if each Transaction represented by the Allocation is within the specified time period in the Quota object. At step 608, it is determined if each Transaction represented by the Allocation is eligible under the Quota Eligibility Rules. If the Allocation is eligible and in the appropriate time period, the Performance Measure for that Transaction is multiplied by the weight according to the Allocation at step 610 and added to a running total of the Sales Representative's performance at step 612.

The following calculation represents the current state of an individual Sales Representative with respect to a Quota in accordance with the above method:

$$f(Q, P, S) = \sum_{T \in Trans(Q,P)} \sum_{A \in T.Allocs} U?(A.SalesTeam = S) *$$

$$Q.Eligible?(T) Q.Measure(T) * A.Weight$$

where:
Trans(Q, P)={T\T. TransDate≧I. StartDate and T. TransDate<I. EndDate and I=Q. Instances(P)
T. Allocs={Allocations associated with T}
T=T with T. SalesTeam=S $$U?(x) = \begin{cases} 1 & x = \text{true} \\ 0 & x = \text{false} \end{cases}$$

$$Q.Eligible?(x) = \begin{cases} 1 & \exists\, r \in Q.EligibleSet \text{ such that } r(x) = \text{true} \\ 0 & \text{otherwise} \end{cases}$$

Figure 7:
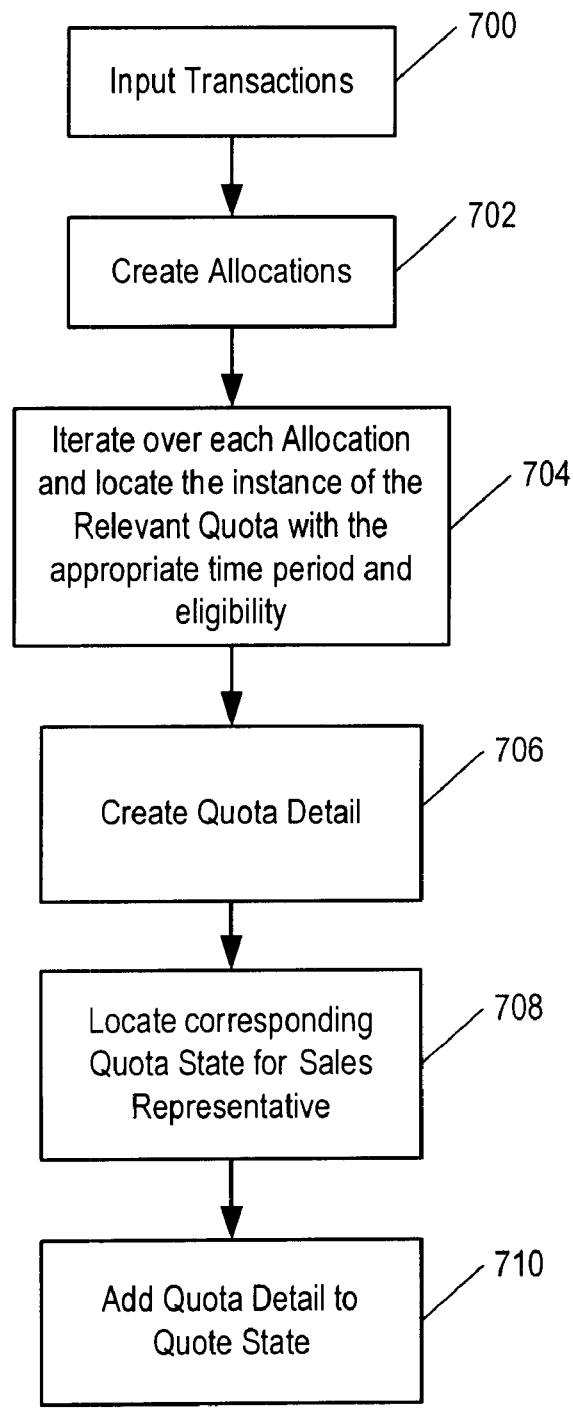
FIG. 7 demonstrates a method for calculating the current performance of a sales representative with respect to a quota in accordance with one embodiment of the invention.

Another way to view the process of determining the current Performance of an individual Sales Representative is illustrated in FIG. 7. At step 700, all of the Transactions (or a set of Transactions) are entered into the system. At step 702, the Allocations for the Transactions are created. At step 704, the method iterates over each Allocation and locates the instance of the relevant eligible Quota for the desired time period. At step 706, a Quota Detail is created. A Quota Detail contains the change that will result in the current Performance state. Thus, a Quota Detail is the mechanism to track the changes in a Quota State. At step 708, the corresponding Quota State for the Sales Representative desired is located and the Quota Detail is added to the Quota State at step 710.

Promotions

Once the performance statistics have been accumulated in the Quota State, there needs to be a way to specify how to pay Sales Representatives based on their Performance. A Promotion (also referred to as a Bonus of Commission) provides that mechanism. A Promotion consists of a reference to a single primary Quota, a collection of Sales Representative participants, and a collection of Promotion Rules. Each Promotion Rule, when fired, generates a Ledger Item indicating a payment to a Sales Representative.

Promotion Rules

A Promotion Rule has two components: (1) a Quota Level predicate; and (2) a Reward Formula. When a participant's Performance reaches a rule's predicted level, the rule fires, and the Sales Representative receives credit equal to the value specified by the reward formula. The reward formula is a mathematical formula with variables supplied by the appropriate Quota State. Table 5 demonstrates some sample Promotion Rules.

TABLE 5

| | Quota Level | Reward |
| --- | --- | --- |
| 1 | Bronze | 100 |
| 2 | Silver | Performance * 10 |
| 3 | | Performance / Target * 9000 |
| 4 | | Ratio * Reward |
| 5 | | Ratio & SalesTeam.Salary * 0.05 |
| 6 | | Rank < 5 ? (5 − Rank) * 100:0 |

The first rule imparts a $100 reward on a participant that reaches the 'Bronze' Quota Level; that is, when a participant Sales Representative achieves the Bronze level, a LedgerItem is createdwith Credit equal to 100. If the Performance Measure of the Promotion's Quota is "Units", then the second rule pays $10 for each item sold if the participant reaches the 'Silver' level. (If the Performance Measure is "Revenue", however, the second rule doesn't make much sense, in that the recipient would receive ten times as much revenue as he brought in.) Any property in the Quota State may be used in the Reward Formula.

A rule need not have a Quota level predicate (e.g., rules 3–6); if no predicate exists, the rule always fires. Also more than one rule in a Promotion can fire, either due to the lack of a predicate, or overlapping Quota Levels. The third rule references both the Sale Team's performance and his target and creates a ratio that is multiplied times a reward amount. Rule 3 pays on a sliding scale, in which the participant receives exactly $9,000 when the target is met, $4500 at 50% of the target, etc. In one embodiment, the Performance/Target ratio may be replaced with a variable "Ratio" that can be used in its place. For the same reason that a user may desire to set targets individually for each Sales Representative, it is advantageous to set the reward value ($9000 here) on a participant by participant basis as well (e.g., pay a larger amount to a large sales team). For that reason, the Quota State object has a "Reward" property in addition to Performance and Target. Therefore, if every Sales Representative's Reward value was equal to 9000, rule 3 and rule 4 above are identical. In truth, any number of additional properties can be added to the Quota State object, and thereafter the properties can be used in Promotional Rules.

The participant corresponding to a Quota State is available through the Quota State's "Sales Representative" property. Thus, all of the participant's properties are also available in the reward formula. Rule 5 demonstrates this; it rewards a Sales Representative that achieves its target with 5% of the Representative's base salary.

In addition to the Quota State variables, four (4) types of additional "Rank" related variables are available for use in a Reward Formula that allow rules based on where a Sales Representative ranks relative to other participants in the Promotion or Quota: (1) Rank: the rank of a Sales Representative in a group (e.g., the most sales or the top four sellers); (2) Quota Rank: the rank among Quotas; (3) Ratio Rank: the rank based on percentage sales and not raw sales; and (4) Quota Ratio Rank.

The "Rank" variable corresponds to the cardinality of the Sale Team's raw performance compared with all the other participants of this Promotion. Quota Rank is the same rank taken from the participants of the Quota, which is a superset of the Promotion's participants. Ratio Rank (also referred to as Percent Rank) and Quota Ratio Rank (also referred to as Quota Percentage Rank) are similar rank variables that are based on performance as a percentage of target, rather than raw performance. Rule 6, which uses the branching operator (?:) pays $400 to the highest ranking Sales Representative, $300 the second, $200 to the third, $100 to the fourth, and nothing to the rest.

The Ratio and Rank variables do not reside on the Quota State object, but are supplied specifically for the Promotion Rules by the Commission System/Engine.

Multi-QuotaLevel Predicates

Incentive plans may have rules that are based on the successful attainment of multiple goals. For example, a user may not want to give a reward to a Sales Representative unless the representative sells 10,000 hammers and 10,000 saws. The Quotas for 10,000 hammers and 10,000 saws may be stored in separate Quotas if these amounts are being utilized to attain another Promotion, for example. For this reason, a Promotion may have zero or more secondary Quotas, and Promotion Rules with multiple corresponding Quota Level Predicates.

TABLE 6

|   | Primary | Secondary | Reward |
|---|---------|-----------|--------|
| 1 | Bronze |  | 0.05 * Performance |
| 2 | Silver | Satisfactory | 0.07 * Performance |
| 3 | Gold | Satisfactory | 0.10 * Performance |

Table 6 demonstrates some examples of multi-quota level promotion rules. A Sales Representative must achieve Silver level in the primary Quota, and he must be Satisfactory in the secondary Quota in order to receive a bonus of 7% of his sales. Note that if a Sales Representative has not achieved Bronze or Satisfactory levels, he will not receive any credit (no rule will fire).

One embodiment of the invention provides that the variables in the reward formulae are all based on Quota States from the primary Quota and the formula may not use performance statistics from the secondary Quotas. Another embodiment of the invention provides full Multi-Quota support in which a reward formula would be able to use the Performance, Target, and Reward variables from any dependent Quota. Another embodiment of the invention provides the ability to set a Promotion based on the ratio of specific products to total products (referred to as Penetration). For example, if the manufacturer does not want the Sales Representative to sell too many red hammers, a ratio of 1:4 may be utilized.

Retroactive versus Point-Forward

One embodiment of the invention provides for an additional property of a Promotion that affects the output of the Commission Engine (i.e., the amount paid to a Sales Representative). This property is a string or flag that indicates whether calculations are to be performed retroactively or point forward (also called incrementally). The effect of this property is best illustrated through example. Consider a simple non-targeted monthly Quota beginning on Jan. 1, 1997, which tracks sales of hammers. This Quota has "Units" as the Performance Measure, and two Quota Levels:

|   | Name | Start | End |
|---|------|-------|-----|
| 1. | Bronze | 0 | 1000 |
| 2. | Silver | 1000 | Infinity |

Consider also a Promotion referencing this Quota; with two rules:

|   | Quota Level | Reward |
|---|-------------|--------|
| 1. | Bronze | Performance |
| 2. | Silver | Performance * 2 |

Finally, imagine that there are two eligible Allocations:

|   | TransDate | Units | Product | SalesTeam | Weight |
|---|-----------|-------|---------|-----------|--------|
| 1. | 1/05/97 | 500 | Hammer | Joshua | 100% |
| 2. | 1/20/97 | 1000 | Hammer | Joshua | 100% |

A LedgerItem represents that amount paid to a Sales Representative and is discussed in detail below. An analysis of the Ledger Items generated demonstrates varying results dependent on the timing of the Engine execution. For example, assume that the Engine is run once, on February first. The natural assumption would be to look at the total performance, 1500, decide that Joshua has achieved the Silver level, and should therefore receive a payment of $3,000. This type of analysis corresponds to a "Retroactive" Promotion, in which the final level achieved applies retroactively to the beginning of the period. If the same example is utilized but the Engine runs twice, on Jan. 15, 1997, and again on Jan. 31, 1997, a different result is likely. When the Engine is first run, the total performance is 500, so a LedgerItem with a credit of $500 is generated (the Bronze level rule fires). At the end of January, the total performance is 1500, so a LedgerItem is generated for $2,500, which is the total $3,000 deserved minus the $500 already paid out.

Point-Forward promotions specify that when a Sales Representative reaches a new Quota Level, Promotion Rules for that level only apply for subsequent Transactions. In other words, the Sales Representative only achieves a reward for that portion of items sold in a specific level. Consider the example above for a Point-Forward promotion with two Engine executions. The first payment would still be $500, as Joshua is unambiguously within the Bronze level on Jan. 15, 1997. However, the second payment is difficult to determine. The case could be made for three different amounts: $1,000 (1000 hammers sold keeping Joshua in the Bronze level), $1,500 (500 hammers sold to complete the first 1000 in the bronze level for $500 and 2*500 for the next 500 hammers sold in the Silver level), or $2,000 (1000*2 for 1000 hammers sold in the silver level).

The second transaction places Joshua into the Silver level. If this transaction qualifies for the Silver level rule, it would generate a $2,000 Ledger Item. If this transaction does not qualify (because it "began" in the Bronze level), it would generate a $1,000 Ledger Item. In both of these cases, the transaction order becomes very important. For example, if a third transaction arrives dated Jan. 10, 1997 (out of order), it would be necessary to process not just the new transaction, but also to reprocess the transaction from Jan. 15, 1997. It seems counter-intuitive that two unrelated transactions have such an effect on one another.

In one embodiment, the Engine defaults to Point Forward analysis and generates the final possible answer discussed above: $1,500. This quantity can be determined by examining the Promotion Rules and the total Performance (1500 units). Of the total Performance of 1500, 1000 are in the Bronze level ($1,000), and 500 are in the Silver level ($1,000). Since the system has already paid out $500 from the first transaction, it creates a new Ledger Item for $1,500.

Ledger Items

A Ledger Item indicates the amount paid to a Sales Representative. Whenever a Quota Detail is created (indicating a change in Quota State performance), the Quota State, Quota Instance, and Quota's time stamp is updated with the current time. When the Commission System/Engine is asked to pay a Promotion, it finds all Quota States that have been changed since the Promotion was last paid. For each of those Quota States, the Engine calculates the total amount of credit that should be paid to the Sales Representative, based on the Quota State and the Promotion Rules. It is possible to determine the amount to be paid directly from the Quota State; there is no need to examine the Transactions or Allocations which contributed to that Quota State (this ability is discussed below).

Once the total amount of money to be paid is known, the Engine finds the amount of money which has already been paid (by querying for all Ledger Items associated with this Promotion, Sales Representative, and Period), and generates a new Ledger Item for the difference (if non-zero). The output of the Commission is not dependent on the frequency that the engine is run. For example, the output will be the same if the engine is run every night or once a month. By maintaining multiple Ledger Items, flexibility is allowed over time. For example, a user who wants to write a check number on LedgerItems when they are sent to payroll can do so.

Another feature of creating Ledger Items is the ability to implement Draws. A Draw is when a Sales Representative is paid ahead of time for expected sales. By creating a LedgerItem representing each of these payments, it is possible to use a reconciliation function to repay the draw. Since the Engine always subtracts the total amount paid from the total amount which should have been paid, the next time the Engine is run, it will credit a LedgerItem debiting the amount of the Draw. To delay the reconciliation, the "ignore" property on each Draw LedgerItem may be set to True. (Transactions have a similar Ignore property, indicating that the Engine should not process them).

Effectivity Dating

One embodiment of the invention provides for effectivity dating. Effectivity Dating provides the ability to specify when specific Quotas and Promotions apply to specific individuals. Such an ability is useful when a Sales Representative or Manager moves from one location to another. Effectivity Dating ensures that the Representative's prior sales are taken into account at the new location in determining Promotions that the Representative may receive.

Optimization to Performance

When discussing Engine performance, it is important to realize that the design of the commission model greatly influences the time it takes to process Transactions. Typically, performance is measured in number of Transactions processed per hour, as the computation time will scale linearly in that parameter. In one embodiment a write transaction to a database occurs at the rate of 50–100 rows/second. When thousands or millions of rows are written to a database, the data write can take a considerable amount of time.

Referring to FIG. 2, various model characteristics affect processing time including the Allocation 202 to Transaction 200 ratio (that is, the average number of people who are allocated credit for a single sale), the Quota Detail 204 to Allocation 202 ratio (that is, the average number of "Quotas", or performance metrics, to which each Allocation applies), and the total number of Quotas 212 in a model. Commonly, the Allocation Ratio (A:T) is in the 3–8 range, the Quota Detail Ratio (D:A) is in the 1–6 range, and the number of Quotas range anywhere from 20–200.

In one embodiment three tables are utilized to store all Transactions: (1) a table for the base of all objects; (2) a table for the base of commission objects; and (3) a table for the object itself. Whenever an Allocation or Quota Detail is created, a row is added to all three tables. In one embodiment the commission object table is eliminated. By eliminating the use of one table, the number of transactions stored on the databases are reduced by ⅓. In another embodiment, all three tables are combined into one table reducing the number of transactions on a database by ⅔.

In one embodiment of the invention, the least important transactions are delayed until a time when a computer processor is available for a large period of time (e.g., delayed until the weekend). The aspects of the invention that are used most frequently and must be current are the Quota State and Ledger items (i.e., the Sales Representative needs to have the ability to check the current performance level and total sales and the system needs to know how much to pay a Sales Representative). To accomplish this delay without forfeiting the integrity of the data, three tasks are performed: (1) Accumulation; (2) Unpacking; and (3) Compensation.

Accumulation

Accumulation is also referred to as the mainline of one embodiment of the invention. The Accumulation stage examines a set of Transactions, changes/updates the Quota States and produces a set of packages. A package is a binary string consisting of a compressed group of Allocations and Quota Details. One mechanism of a database that may be utilized is the ability to save a Binary Large Object (BLOB) more rapidly than the group of objects corresponding to the single BLOB. Thus, a package may be rapidly stored in a database using the BLOB functionality. However, saving a BLOB has one disadvantage of disabling the standard querying mechanisms of a database for those saved objects.

Unpacking

The Unpacking task loads all of the packages, creates the relevant objects (e.g., the Allocations and Quota Details) and saves the objects to the database in the standard fashion. By delaying the creation of the Quota Detail Objects and Allocations until a later date, the largest processing portion of the invention is delayed while the Quota States are still current.

Compensating

The Compensating task examines the Quota States and creates ledger items (using the Promotion object). The Compensating task may be performed prior to the Unpacking task.

By using the three tasks above, Sales Representatives may examine their current Quota States and receive timely and current payment (through the ledger items) while delaying the largest processing portion (i.e., the Quota Details and Allocations) until a large portion of processing time is available (e.g., at night or on the weekend).

Parallelization

In one embodiment of the invention, the operations may be divided between several computers. For example, the Quota Details creation and write transactions may be divided amongst several computers each creating a separate but linear table. Subsequently, the tables may be concatenated together to create a single table for standard use.

In addition, the mainline computation can also be parallelized. If parallel processing (parallelization) is utilized for this purpose, a fourth task of Aggregation is added to the three tasks discussed above. The Aggregation task aggregates all of the accumulated results on each individual machine into one table in the database. In such an embodiment, the ledger items are not activated for payment until the aggregation task has completed.

Thus, a method and apparatus for determining a commission is described in conjunction with one or more specific embodiments. The invention is defined by the claims and their full scope of equivalents.

What is claimed is:

1. A method for determining commissions to pay out to a set of recipients based on one or more transactions, wherein the method is implemented using a data processing system that includes (A) a model to store data useful for governing aspects of commission processing, wherein the model includes (i) a quota module, (ii) allocation rules, and (iii) a promotions data module and (B) a processing engine to access the model and receive each transaction, to process each transaction in accordance with the model, and to prepare ledger items, the method comprising:

executing instructions in the data processing system for:

obtaining the one or more transactions;

obtaining from the quota module of the model one or more quotas that apply to the one or more transactions, and which represent levels of commissions available to a set of recipients;

determining a quota state for each recipient using the processing engine, wherein each quota state includes recipient identification data and current performance data of the identified recipient;

obtaining from the promotion data module of the model one or more promotions that specify a reward for one or more of the levels;

calculating performances of the set of recipients using the processing engine, wherein calculating performances comprises:

obtaining one or more of the allocation rules of the model corresponding to the transactions wherein for each of the transactions, each of the allocation rules apportions one or more credits in varying proportions to one or more subsets of the set of recipients; and applying the allocation rules to the transactions using the quotas and quota states to calculate the performances;

determining, using the processing engine, if the performances qualify for the promotions; and preparing ledger items, using the processing engine, that specify compensation to be paid for the set of recipients in amounts determined by the promotions if the performances of the set of recipients reach a qualifying threshold of the level.

2. The method of claim 1 wherein one of the quotas further specifies:

a time period;

a set of one or more eligibility rules; and a performance measure.

3. The method of claim 2 wherein the performance measure provides the ability to quantify the transaction.

4. The method of claim 2 wherein one or more of the eligibility rules determines whether one of the transactions applies to the quota.

5. The method of claim 2 wherein the time period determines whether one of the transactions applies to the quota.

6. The method of claim 1 wherein computation of the reward requires use of a mathematical formula.

7. The method of claim 1 wherein calculating performances comprises:

obtaining one or more allocations for the transactions; and adding an eligible allocate to a performance total.

8. The method of claim 7 wherein the adding an eligible allocation comprises:

obtaining a change in performance based on the allocation; and adding the change in performance to a performance total.

9. The method of claim 7 wherein the obtaining one or more of the allocation rules of the model comprises processing an allocation rule that is based on one or more properties of a business.

10. The method of claim 1 implemented in an object oriented environment.

11. The method of claim 1 wherein the calculating performances is executed using parallel processing on one or more of the computer systems.

12. The method of claim 11 wherein the parallel processing comprises:

accumulating one or more packages containing details regarding the set of recipients' performances using multiple processors;

unpacking the packages into objects containing the details;

saving the objects containing details; and aggregating the saved objects into one or more tables.

13. The method of claim 1 further comprising displaying a report of the set of recipients' performances.

14. A computer program product comprising:

a computer readable medium that includes (A) a model encoded thereon, the model to store data useful for governing aspects of commission processing, wherein the model includes (i) a quota module, (ii) allocation rules, and (iii) a promotions data module and (B) computer readable code encoded thereon to access the model and receive each transaction, to process each transaction in accordance with the model, and to prepare ledger items, the computer readable code comprising code for:

executing instructions in the data processing system for:

obtaining the one or more transactions;

obtaining from the quota module of the model one or more quotas that apply to the one or more transactions, and which represent levels of commissions available to a set of recipients;

determining a quota state for each recipient using the processing engine, wherein each quota state includes recipient identification data and current performance data of the identified recipient;

obtaining from the promotion data module of the model one or more promotions that specify a reward for one or more of the levels;

calculating performances of the set of recipients using the processing engine, wherein calculating performances comprises:

obtaining one or more of the allocation rules of the model corresponding to the transactions wherein for each of the transactions, each of the allocation rules apportions one or more credits in varying proportions to one or more subsets of the set of recipients; and applying the allocation rules to the transactions using the quotas and quota states to calculate the performances;

determining if the performances qualify for the promotions; and preparing ledger items, using the processing engine, that specify compensation to be paid for the set of recipients in amounts determined by the promotions if the performances of the set of recipients reach a qualifying threshold of the level.

15. The computer program product of claim 14 wherein the code for obtaining one or more transactions comprises code for inputting the one or more transactions into the data processing system.

16. The computer program product of claim 14 wherein one of the quotas further specifies:

a time period;

a set of one or more eligibility rules; and a performance measure.

17. The computer program product of claim 16 wherein the performance measure provides the ability to quantify the transaction.

18. The computer program product of claim 16 wherein one or more of the eligibility rules determines whether one of the transactions applies to the quota.

19. The computer program product of claim 16 wherein the time period determines whether one of the transactions applies to the quota.

20. The computer program product of claim 14 wherein preparing ledger items requires use of a mathematical formula.

21. The computer program product of claim 14 wherein the code for calculating performances comprises:

code for obtaining one or more allocations for the transactions; and code for adding an eligible allocation to a performance total.

22. The computer program product of claim 21 wherein the code for adding an eligible allocation comprises:

code for obtaining a change in performance based on the allocation; and code for adding the change in performance to a performance total.

23. The computer program product of claim 21 wherein the code for obtaining one or more allocations comprises code for processing an allocation rule that is based on one or more properties of a business.

24. The computer program product of claim 14 implemented in an object oriented environment.

25. The computer program product of claim 14 further comprising code for defining a referential property by the code for calculating performances and for determining if the performances qualify for the promotions.

26. The computer program product of claim 14 wherein the code for calculating performances is executed using parallel processing on one or more of the computer program products.

27. The computer program product of claim 26 wherein the parallel processing comprises:

code for accumulating one or more packages containing details regarding the set of recipients' performances using multiple processors;

code for unpacking the packages into objects containing the details;

code for saving the objects containing details; and code for aggregating the saved objects into one or more tables.

28. The computer program product of claim 14 further comprising code for displaying a report of the set of recipients' performances.

29. The computer program product of claim 14 wherein the model further includes an apportionment rule template, and the apportionment rule template includes apportionment rule attributes and apportionment rules, which have values corresponding to the apportionment rule attributes for determining credit to be apportioned to each of the sales representatives who are eligible to receive the credit.

30. The computer program product of claim 29 wherein the model includes at least one apportionment rule template associated with each sales representative, each apportionment rule template includes apportionment rule attributes and apportionment rules for the associated sales representative, and the apportionment rules include values corresponding to the apportionment rule attributes for determining credit to be apportioned to the associated sales representative if the sales representative is, in accordance with the apportionment rule template, eligible to receive the credit.

31. The computer program product of claim 14 wherein the quota module includes properties that characterize criteria for meeting at least one predetermined objective for each sales representative.

32. The computer program product of claim 31 wherein the properties of the quota module are members of the group comprising: (i) a temporal property, (ii) a performance measure, (iii) eligibility rules, and (iv) quota levels.

33. The computer program product of claim 14 wherein the quota state includes properties of (i) sales representative identification and (ii) sales representative achievement target.

34. The computer program product of claim 33 wherein the achievement target property is implemented as a rule.

35. The computer program product of claim 14 wherein the promotion data module includes promotion rules, a reference to a quota for each sales representative, and references to the sales representatives.

36. The computer program product of claim 35 wherein the promotion rule causes the processing engine to prepare the ledger items to a sales representative based on the levels of commission of the sales representative and a rewards formula associated with the level.

37. The computer program product of claim 14 wherein the promotions data module further includes a reward module to access rank information among sales representatives for generation of the ledger items by the processing engine.

38. The computer program product of claim 14 wherein the sales representatives are organized in a hierarchy.

39. A method for paying out a commission to a set of recipients based on one or more transactions, wherein the method is implemented using a data processing system that includes (A) a model to store data useful for governing aspects of commission processing, wherein the model includes (i) a quota module, (ii) allocation rules, and (iii) a promotions data module and (B) a processing engine to access the model and receiving each transaction, and to process each transaction in accordance with the model, the method comprising:

執行 instructions in the data processing system for:
    obtaining the one or more transactions;
    obtaining from the quota module of the model one or more quotas that apply to the one or more transactions, and which represent levels of commissions available to a set of recipients;
    determining a quota state for each recipient using the processing engine, wherein each quota state includes recipient identification data and current performance data of the identified recipient;
    obtaining from the promotion data module of the model one or more promotions that specify a reward for one or more of the levels;
    calculating performances of the set of recipients using the processing engine, wherein calculating performances comprises:
        obtaining one or more of the allocation rules of the model corresponding to the transactions wherein for each of the transactions, each of the allocation rules apportions one or more credits in varying proportions to one or more subsets of the set of recipients; and
        applying the allocation rules to the transactions using the quotas and quota states to calculate the performances;
    determining, using the processing engine, if the performances qualify for the promotions; and
    paying out compensation to the recipients whose performance qualifies for one or more of the promotions.

40. A commission system, implemented in an electronic data processing system, for determining commissions for a plurality of sales representatives based on at least one transaction, the system comprising:

a model to store data useful for governing aspects of commission processing, wherein the model includes (i) a quota module, (ii) apportionment rules, and (iii) a promotions data module;

at least one computer readable medium having the model and computer readable instructions embodied therein, wherein the computer readable instructions implement a processing engine; and a processor coupled to the computer readable medium to execute the computer readable instructions;

wherein the a processing engine includes code to:
    access the model and receive each transaction;
    process each transaction in accordance with the model;
    prepare ledger items;
    obtain the one or more transactions;
    obtain from the quota module of the model one or more quotas that apply to the one or more transactions, and which represent levels of commissions available to a set of recipients;
    determine a quota state for each recipient using the processing engine, wherein each quota state includes recipient identification data and current performance data of the identified recipient;
    obtain from the promotion data module of the model one or more promotions that specify a reward for one or more of the levels;
    calculate performances of the set of recipients using the processing engine, wherein calculating performances comprises:
        obtain one or more of the apportionment rules of the model corresponding to the transactions wherein for each of the transactions, each of the apportionment rules apportions one or more credits in varying proportions to one or more subsets of the set of recipients; and
        apply the apportionment rules to the transactions using the quotas and quota states to calculate the performances;
    determine if the performances qualify for the promotions; and
    prepare ledger items, using the processing engine, that specify compensation to be paid for the set of recipients in amounts determined by the promotions if the performances of the set of recipients reach a qualifying threshold of the level.

41. The commission system of claim 40 wherein at least two of the sales representatives are eligible to receive the credit apportioned for one transaction.

42. The commission system of claim 40 wherein the model further includes an apportionment rule template, and the apportionment rule template includes apportionment rule attributes and apportionment rules, which have values corresponding to the apportionment rule attributes for determining credit to be apportioned to each of the sales representatives who are eligible to receive the credit.

43. The commission system of claim 42 wherein the model includes at least one apportionment rule template associated with each sales representative, each apportionment rule template includes apportionment rule attributes and apportionment rules for the associated sales representative, and the apportionment rules include values corresponding to the apportionment rule attributes for determining credit to be apportioned to the associated sales representative if the sales representative is, in accordance with the apportionment rule template, eligible to receive the credit.

44. The commission system of claim 40 wherein the quota module includes properties that characterize criteria for meeting at least one predetermined objective for each sales representative.

45. The commission system of claim 44 wherein the properties of the quota module are members of the group comprising: (i) a temporal property, (ii) a performance measure, (iii) eligibility rules, and (iv) quota levels.

46. The commission system of claim 40 wherein the quota state includes properties of (i) sales representative identification and (ii) sales representative achievement target.

47. The commission system of claim 46 wherein the achievement target property is implemented as a rule.

48. The commission system of claim 40 wherein the promotion data module includes promotion rules, a reference to a quota for each sales representative, and references to the sales representatives.

49. The commission system of claim 48 wherein the promotion rule causes the processing engine to prepare the ledger items to a sales representative based on the levels of commission of the sales representative and a rewards formula associated with the level.

50. The commission system of claim 40 wherein the promotions data module further includes a reward module to access rank information among sales representatives for generation of the ledger items by the processing engine.

51. The commission system of claim 40 wherein the sales representatives are organized in a hierarchy.

52. A commission system, implemented in an electronic data processing system, for determining commissions for a plurality of sales representatives based on at least one transaction, the system comprising:
- at least one computer readable medium having computer readable instructions embodied therein, wherein the computer readable instructions implement a processing engine; and
- a processor coupled to the computer readable medium to execute the computer readable instructions;
- wherein the a processing engine includes code to:
  - access a model and receive each transaction, the model for storing data useful for governing aspects of commission processing, wherein the model includes (i) a quota module, (ii) apportionment rules, and (iii) a promotions data module;
  - process each transaction in accordance with the model;
  - prepare ledger items;
  - obtain the one or more transactions;
  - obtain from the quota module of the model one or more quotas that apply to the one or more transactions, and which represent levels of commissions available to a set of recipients;
  - determine a quota state for each recipient using the processing engine, wherein each quota state includes recipient identification data and current performance data of the identified recipient;
  - obtain from the promotion data module of the model one or more promotions that specify a reward for one or more of the levels;
  - calculate performances of the set of recipients using the processing engine, wherein calculating performances comprises:
    - obtain one or more of the apportionment rules of the model corresponding to the transactions wherein for each of the transactions, each of the apportionment rules apportions one or more credits in varying proportions to one or more subsets of the set of recipients; and
    - apply the apportionment rules to the transactions using the quotas and quota states to calculate the performances;
  - determine if the performances qualify for the promotions; and
  - prepare ledger items, using the processing engine, that specify compensation to be paid for the set of recipients in amounts determined by the promotions if the performances of the set of recipients reach a qualifying threshold of the level.

53. An apparatus to determine commissions for a plurality of sales representatives based data associated with at least one transaction stored in electronic memory, the apparatus comprising:
- means for apportioning credit for each transaction to each of the sales representatives in accordance with a predetermined data model stored in electronic memory, wherein the data model includes (i) a quota module, (ii) apportionment rules, and (iii) a promotions data module;
- means for processing the transaction;
- means for referencing the apportionment rules of the data model and apportionment attributes stored in the model;
- means for determining which of the sales representatives are eligible to receive credit for the transaction by processing the properties of the apportionment rules and attributes; and
- means for determining a quota state for each recipient, wherein each quota state includes recipient identification data and current performance data of the identified recipient; and
- means for determining the credit for each eligible sales representative by processing the properties of the apportionment rules and attributes and quota state;
- means for determining payment amounts, for each of the sales representatives to whom credit is apportioned, in accordance with promotions data in the promotions data module of the data model; and
- means for generating a ledger item for each sales representative for whom a payment amount is determined.

54. A method comprising:
- populating a data model for storage in an electronic memory, the model for storing data useful for governing aspects of commission processing by a separate processing engine, wherein the model includes (i) a quota module, (ii) apportionment rules, and (iii) a promotions data module, wherein the processing engine is implemented in an electronic data processing system to execute code for:
  - obtaining the one or more transactions;
  - obtaining from the quota module of the model one or more quotas that apply to the one or more transactions, and which represent levels of commissions available to a set of recipients;
  - determining a quota state for each recipient using the processing engine, wherein each quota state includes recipient identification data and current performance data of the identified recipient;
  - obtaining from the promotion data module of the model one or more promotions that specify a reward for one or more of the levels;
  - calculating performances of the set of recipients using the processing engine, wherein calculating performances comprises:
    - obtaining one or more of the allocation rules of the model corresponding to the transactions wherein for each of the transactions, each of the allocation rules apportions one or more credits in varying proportions to one or more subsets of the set of recipients; and
    - applying the allocation rules to the transactions using the quotas and quota states to calculate the performances;
  - determining, using the processing engine, if the performances qualify for the promotions; and
  - preparing ledger items, using the processing engine, that specify compensation to be paid for the set of recipients in amounts determined by the promotions if the performances of the set of recipients reach a qualifying threshold of the level.

55. The method of claim 54 wherein the model further includes an apportionment rule template, and the apportionment rule template includes apportionment rule attributes and apportionment rules, and the apportionment rules include values corresponding to the apportionment rule attributes for determining credit to be apportioned to each of the sales representatives who are eligible to receive the credit.

56. The method of claim 55 wherein the model includes at least one apportionment rule template associated with each sales representative, each apportionment rule template includes apportionment rule attributes and apportionment rules for the associated sales representative, and the apportionment rules include values corresponding to the apportionment rule attributes for determining credit to be apportioned to the associated sales representative if the sales representative is, in accordance with the apportionment rule template, eligible to receive the credit.

57. The method of claim 54 wherein the quota module includes properties that characterize criteria for meeting at least one predetermined objective for each sales representative.

58. The method of claim 54 wherein the promotions further include information associated with performance factors of each sales representative for generation of the ledger items by the processing engine.

59. The method of claim 58 wherein the promotions include promotion rules, a reference to a quota for each sales representative, and references to the sales representatives.

60. A computer system comprising:

at least one computer readable medium having a model and computer readable instructions embodied therein, wherein the computer readable instructions implement a processing engine;

wherein the model is accessible for commission processing by the processing engine, wherein the model includes (i) a quota module, (ii) apportionment rules, and (iii) a promotions data module;

a processor coupled to the computer readable medium to execute the processing engine; and a display, coupled to the processor, having a graphical user interface, displayable by a computer, to receive data for populating data fields of a rule template associated with the model;

wherein the processing engine comprises code for:
      obtaining the one or more transactions;
      obtaining from the quota module of the model one or more quotas that apply to the one or more transactions, and which represent levels of commissions available to a set of recipients;
      determining a quota state for each recipient using the processing engine, wherein each quota state includes recipient identification data and current performance data of the identified recipient;
      obtaining from the promotion data module of the model one or more promotions that specify a reward for one or more of the levels;
      calculating performances of the set of recipients using the processing engine, wherein calculating performances comprises:
         obtaining one or more of the allocation rules of the model corresponding to the transactions wherein for each of the transactions, each of the allocation rules apportions one or more credits in varying proportions to one or more subsets of the set of recipients; and
         applying the allocation rules to the transactions using the quotas and quota states to calculate the performances;
      determining, using the processing engine, if the performances qualify for the promotions; and
      preparing ledger items, using the processing engine, that specify compensation to be paid for the set of recipients in amounts determined by the promotions if the performances of the set of recipients reach a qualifying threshold of the level.

61. A method for determining commissions for a plurality of sales representatives based on at least one transaction, the method comprising:

receiving data in a computer system associated with each transaction; and executing code with a processing engine in the computer system for:
      apportioning credit for each transaction to each of the sales representatives in accordance with a predetermined data model stored in electronic memory wherein the data model includes (i) a quota module, (ii) apportionment rules, and (iii) a promotions data module, wherein apportioning credit for each transaction further comprises:
         processing the transaction;
         referencing the apportionment rules of the model and apportionment attributes stored in the model;
         determining which of the sales representatives are eligible to receive credit for the transaction by processing the properties of the apportionment rules and attributes; and
         determining a quota state for each recipient using the processing engine, wherein each quota state includes recipient identification data and current performance data of the identified recipient; and
         determining the credit for each eligible sales representative by processing the properties of the apportionment rules and attributes, and quota state;
         determining payment amounts, for each of the sales representatives to whom credit is apportioned, in accordance with promotions data in the promotions data module of the data model; and
      generating a ledger item for each sales representative for whom a payment amount is determined.

62. The method of claim 61 wherein processing the transaction comprises:

identifying the sales representative who made a sale associated with the transaction;

identifying each product that is a subject of the transaction;

identifying each customer associated with the transaction; and identifying payable amounts for each product that is a subject of the transaction.

63. The method as in claim 61 wherein determining payment amounts further comprises:

for each transaction, examining a current state of performance of each sales representative eligible to receive a commission for the transaction.-

64. The method of claim 63 wherein the state of performance of each sales representative is based on a time of the transaction, a performance measure of each sales representative eligible to receive a commission for the transaction, eligibility rules, and a quota level.

65. The method of claim 61 wherein generating a ledger item further comprises:

retrieving promotion rules from the promotions data module associated with each sales representative eligible to receive a payment; and processing the promotion rules.

66. The method of claim 61 wherein determining payment amounts in accordance with promotions data in the promotions data module further comprises:

determining a quota level of each sales representative eligible to receive payment; and applying a reward formula associated with each sales representative eligible to receive payment.

* * * * *